United States Patent
Beier et al.

[11] Patent Number: 5,815,620
[45] Date of Patent: Sep. 29, 1998

[54] SUPPORT RECEPTACLE AND METHOD FOR PRODUCING THE SAME

[75] Inventors: Axel Beier; Hans-Dieter Weigel, both of Berlin, Germany

[73] Assignee: Siemens Aktiengesellschaft, Munich, Germany

[21] Appl. No.: 795,082

[22] Filed: Feb. 5, 1997

[30] Foreign Application Priority Data

Feb. 5, 1996 [DE] Germany .................. 196 05 027.8

[51] Int. Cl.⁶ .............................. G02B 6/00; G02B 6/36
[52] U.S. Cl. ................................................. 385/80
[58] Field of Search ................... 385/70, 60, 71, 385/72, 73, 58, 66, 65, 59, 63, 54, 75; 174/705; 292/33, 169.13

[56] References Cited

U.S. PATENT DOCUMENTS

| | | | |
|---|---|---|---|
| 4,009,931 | 3/1977 | Malsby et al. | 385/54 |
| 4,208,092 | 1/1980 | Monaghan et al. | 385/55 |
| 4,487,474 | 12/1984 | Nishie et al. | 385/66 |
| 4,616,900 | 10/1986 | Krauter | 385/117 |
| 5,129,023 | 7/1992 | Anderson et al. | 385/70 |
| 5,337,386 | 8/1994 | Noll et al. | 385/60 |
| 5,365,182 | 11/1994 | Hartley | 385/77 |
| 5,499,311 | 3/1996 | DeCusatis | 385/89 |

FOREIGN PATENT DOCUMENTS

| | | |
|---|---|---|
| 0 304 182 B1 | 2/1989 | European Pat. Off. . |
| 31 19 232 A1 | 11/1982 | Germany . |
| 195 41 139 C1 | 5/1997 | Germany . |
| 97/15844 | 5/1997 | WIPO . |

*Primary Examiner*—Akm E. Ullah
*Attorney, Agent, or Firm*—Herbert L. Lerner; Laurence A. Greenberg

[57] ABSTRACT

In a support receptacle and a method for producing the same, a molded part is injected into a sleeve that can be produced with great tolerance and has a flange. The molded part has a through-conduit, which serves the purpose of fixation of portions of an optical cable with a glass fiber. On a front end, the molded part tapers conically and a polishing bevel and the glass fiber can preferably be polished in one operation. Such support receptacles can be used for permanent coupling of electrooptical components to optical cables.

10 Claims, 1 Drawing Sheet

SUPPORT RECEPTACLE AND METHOD FOR PRODUCING THE SAME

BACKGROUND OF THE INVENTION

Field of the Invention

The invention concerns the field of preparing optical cable ends and it relates to a support receptacle for coupling an optical cable end piece, including an outer metal sleeve with a coupling side having a flange of weldable material for permanent fixation to a counterpart surface of a coupling partner, and a receiving body at least partly surrounded by the sleeve and having a through-conduit in the longitudinal direction for fixation of portions of a partially unsheathed optical cable.

Optical cables often have a support receptacle on the back end for connecting the optical cables to optoelectronic components. The optical cables include an optical fiber and an optical cable sheath, which surrounds the fiber. The support receptacles as a rule serve to mechanically stabilize the optical cable and to protect a ground front-end surface of the fiber. Typically, ceramic pins with a central bore are used to receive and support the fiber, and the ceramic pin and fiber are severed, ground and polished in a plurality of operations. By way of example, the ceramic pin may be introduced with a precise fit into a metal sleeve that at the same time surrounds the optical cable sheath in a tension-relieving manner. The production of such support receptacles is time-consuming and expensive, since among other things the metal sleeve and the ceramic pin must be manufactured to minimal tolerance.

U.S. Pat. No. 4,925,266 describes an optical plug with an insert, which is surrounded by and anchored in a small external plastic tube. The material of the insert, with a view to its polishing properties and thermal properties, matches the properties of the material of an optical cable received by the insert.

U.S. Pat. No. 4,722,584 relates to an optical plug with an outer metal sleeve having an inner wall surface which is roughened for the sake of form-locking connection to an inner plastic part. A form-locking connection is one which connects two elements together due to the shape of the elements themselves, as opposed to a force-locking connection, which locks the elements together by force external to the elements. In order to increase bending resistance, the sleeve extends rearward to beneath a radial flange formed out integrally from the material of the plastic part.

A support receptacle of the type referred to at the outset is disclosed in European Patent Specification 0 304 182 B1. In it, a cylindrical receiving body is supported axially displaceably in a sleeve have a radial flange. The flange is formed of weldable material and is welded to a carrier for an electrooptical module. The receiving body has a ceramic pin on its front end that fixes an unsheathed, polished fiber end. In addition, the optical cable sheath is fixed in the receiving body. It is not until the receiving body is adjusted in an electrooptical module that the receiving body and the sleeve are durably connected to one another. The sleeve and the receiving body must therefore be adapted dimensionally accurately to one another. That increases production costs to a not inconsiderable extent.

SUMMARY OF THE INVENTION

It is accordingly an object of the invention to provide a support receptacle and a method for producing the same, which overcome the hereinafore-mentioned disadvantages of the heretofore-known devices and methods of this general type and which provide a simple and cost-effective support receptacle for optical cables.

With the foregoing and other objects in view there is provided, in accordance with the invention, a support receptacle for coupling an optical cable end piece, comprising an outer metal sleeve having a coupling side with a flange of weldable material for permanent fixation to a counterpart surface of a coupling partner; and a receiving body at least partly surrounded by the sleeve, injection molded directly in the sleeve and form-lockingly fixed directly in the sleeve, the receiving body having a through-conduit in longitudinal direction for fixation of portions of a partially unsheathed optical cable having a fiber with an unsheathed front end to be fixed in the receiving body.

According to the invention, expensively machined receiving bodies and ceramic pins can be dispensed with. Stringent dimensional demands are not made of the sleeve, either. Only a stop surface, which is formed by the flange and serves the purpose of durable attachment of the support receptacle to a counterpart surface, needs to be plane and flat. The molded part, constructed integrally and preferably as an injected molded part, in a simple way takes on the task of both fixing the polished front-end surface of the fiber and fixing the optical cable sheath. This markedly lowers the production costs.

The integral molded part also precludes mechanical strains on the optical cable that would be caused by different thermal behavior of the materials usually used. The end piece of the optical cable is received entirely by the molded part and is thus surrounded by a single homogeneous material. The intimate form lock between the sheath and the molded part assures a high positional stability of the two elements relative to one another and in use guarantees a durable alignment of the end piece of the optical cable relative to an electrooptical component. Any tensile strains that might occur in the optical cable are advantageously transmitted to the sleeve and the flange.

The formation of the through-conduit cross section of the receiving body can be carried out in the manner known from German Published, Non-Prosecuted Patent Application DE 195 41 139 C1, corresponding to International Application PCT/DE96/02024. Accordingly, on its front end, the through-conduit has a cross section that enables the secure fixation of a bare end of the fiber that has been freed of the optical cable sheath.

The vertical alignment of the through-conduit relative to the stop surface of the sleeve proves to be favorable. This assures that the end of the fiber is disposed vertically to this surface, so that this surface can be used as a reference surface in the later polishing. It is understood that some other alignment is also possible, if desired.

In accordance with another feature of the invention, the receiving body has at least one radial form-locking element that engages the sleeve from behind. This toothed interlocking of the sleeve and molded part provides a favorable force-locking for better absorption of axial and radial forces. Moreover, this improves gas tightness, even in the event of extreme temperature changes.

In accordance with a further feature of the invention, the molded part is constructed frustoconically in the region of its front end, so that the area of the molded part to be machined on the front end can be made markedly smaller than in the ceramic pins usually used. The wear of the polishing medium and the polishing time can be reduced markedly.

Severing the ceramic pin and the fiber jointly, as was previously necessary in the prior art, is no longer unnecessary now. Thus the final machining of the fiber and of the end-surface region of the truncated cone of the molded part, which may also be at a steep angle, can surprisingly be carried out in a single operation.

In accordance with an added feature of the invention, the molded part has a kink protector in the end region. Such a kink protector guards against unintentionally failing to meet critical bending radii, which could cause fiber breakage.

With the objects of the invention in view there is also provided a method for producing a support receptacle, in which the sleeve is used as part of an injection mold for the molded part, a cylindrical mold core, which approximately centrally penetrates the sleeve axially, is placed in the injection mold, a through-conduit is formed through the use of the mold core which may have different outer radii along its longitudinal direction, the through-conduit later offers space for the reception and fixation of the optical cable, and a void between the injection mold, the sleeve and the mold core is then filled by injection with a suitable molding substance. The molded part thus formed in the sleeve is in its final form and as a rule requires no post-machining. In particular, the molded part serves the purpose of fixation of portions of the partly unsheathed optical cable and of tensile strain relief thereof by the fixation of the optical cable sheath and optionally strain relief fibers. The molded part can also be prepared, through the use of special shaping, for protecting the optical cable against kinking.

The production costs for the support receptacle of the invention drop markedly by forming the molded part in the sleeve. The stringent dimensional demands that are typically required can be dispensed with.

The finished molded part can then be used immediately for fixation of portions of an optical cable. To that end, the optical cable is at least partly unsheathed and introduced into the molded part on one end, so that the unsheathed region protrudes part way beyond the molded part at the front end. The fixation is preferably carried out with a fixing composition in the manner described in German Published, Non-Prosecuted Patent Application DE 195 41 139 C1, corresponding to International Application PCT/DE96/02024. After being glued in place, the molded part and the fiber are finally machined on the front end. Typically, the front-end surface of the fiber is not ground precisely perpendicularly to the fiber axis, so as to avoid having interfering reflections when light is coupled in or out. An inclined position of the front-end surface of 6° to 12° is preferred.

Other features which are considered as characteristic for the invention are set forth in the appended claims.

Although the invention is illustrated and described herein as embodied in a support receptacle and a method for producing the same, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
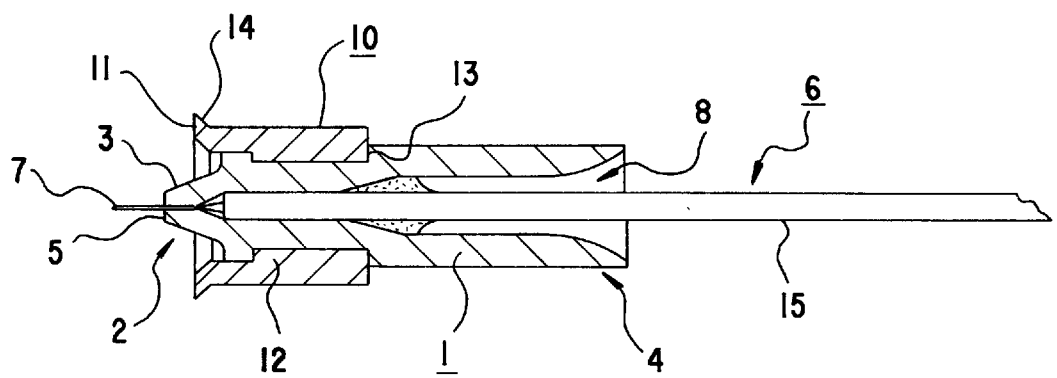
FIG. 1 is a diagrammatic, longitudinal-sectional view of a support receptacle according to the invention.

Referring now to the figures of the drawings in detail and first, particularly, to FIG. 1 thereof, there is seen a basic layout of a support receptacle according to the invention for optical cables. An injection molded part 1 has a front-end region 2 and a back-end region 4. At the front end, the injection molded part 1 ends in the form of a truncated cone 3 with an already preshaped polishing incline 5. A through-conduit 8 tapers toward an end-surface region over the course of a plurality of infinitely graduated transitions, until it has a width that still just barely allows an unsheathed fiber to be introduced. The through-conduit 8 is constructed in such a way that an optical cable 6 is substantially free of adhesive composition and is movably supported in the back-end region 4, while conversely it is fixed with the support of adhesive composition in a portion near the front end of the injection molded part 1. The optical cable 6 includes a fiber 7 and two protective sheaths 15 that envelop the fiber 7. The fiber 7, which is unsheathed along a portion of its length, emerges and is enveloped with adhesive composition from the injection molded part 1 at the front end and is glued together with the protective sheaths 15 in the portion of the injection molded part 1 near the end-surface region. On the back end, the optical cable 6 emerges, free of adhesive composition, from the injection molded part 1. The infinitely graduated change in diameter of the through-conduit 8 on one hand serves the purpose of defined adjustment of capillary forces acting on the adhesive composition and on the other hand of preventing damage to the fiber 7 as the optical cable 6 is threaded into the molded part 1. If there were pronounced offsets, the unsheathed fiber 7 could especially become caught as it was threaded in and it could be irreversibly damaged.

The injection molded part 1 is cast in a sleeve 10 with a metal flange 14 near the front end region. The flange 14 has a stop surface 11, which establishes a surface contact with a counterpart surface of a coupling partner such as an electrooptical module and serves to weld the module in place. The truncated cone 3 of the injection molded part 1 protrudes at least part way beyond the stop surface 11. As a result, the polished front-end surface of the fiber 7 can be extended to a location shortly before an electrooptical component in the module. A collar 12 on an inner surface of the sleeve 10 contributes to better force-locking and form-locking envelopment of the injection molded part 1 and engages an undercut 13 of the injection molded part.

The production of the support receptacle is based on the following method steps. The sleeve 10 is inserted in an injection mold. The final shape of the injection molded part 1 is defined through the use of the injection mold, so that post-machining of the injection molded part 1 is unnecessary. A mold core that has the desired cross-sectional profile of the through-conduit 8 is inserted into the injection mold, coaxially penetrating the sleeve 10. After injection of a suitable injection molding substance into a remaining void and curing of that substance, the injection mold is opened and the injection molded part 1 is removed.

In the next method step, the optical cable 6 and the fiber 7 are glued in place as already described above. Finally, the polishing incline 5 of the truncated cone 3 and the fiber 7 are ground and polished.

The then-completed end of the optical cable 6 can then be connected to an optoelectronic module. The adjustment is carried out with an active transmitter or receiver element (depending on whether it is a module with an electrooptical or an optoelectric component). Once the adjustment has been carried out, the stop surface 11 of the sleeve 10 is permanently fixed to the aforementioned module, for instance by laser welding.

Figure 2:
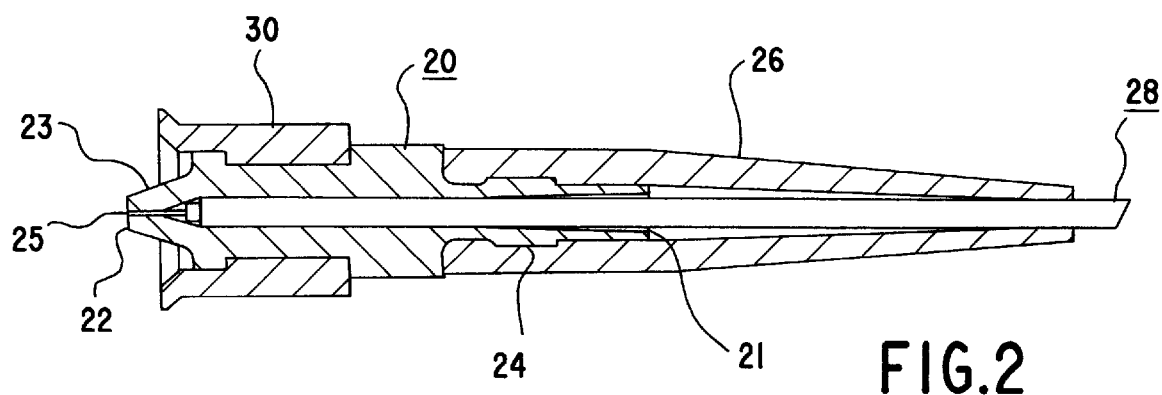
FIG. 2 is a longitudinal-sectional view of an embodiment with a kink protection sheath.

An embodiment of the invention with an additional kink protection sheath is shown in FIG. 2. An injection molded part 20 is injected into a metal flange 30. A through-conduit 21 of the molded part 20 has only a single cross-sectional enlargement. An optical cable 28 is fixed over its entire length in the injection molded part 20 with an adhesive composition. In a truncated cone 23 on the front end, the through-opening 21 tapers down to a diameter that merely surrounds a fiber 25. A polishing incline 22 of the truncated cone 23 is flush with a front end of the fiber 25.

Contours 24 are provided on an outer surface of a final portion of the injection molded part 20 for securing a kink protection sheath 26. The kink protection sheath 26 surrounds a back-end region of the injection molded part 20 and on that end protrudes markedly beyond the injection molded part 20. The kink protection sheath 26 surrounds and supports the optical cable 28 and prevents unintended strain from excessive bending.

We claim:

1. A support receptacle for coupling an optical cable end piece, comprising:
    an outer metal sleeve having a coupling side with a flange of weldable material for permanent fixation to a counterpart surface of a coupling partner; and
    a receiving body at least partly surrounded by said sleeve, injection molded directly in said sleeve and form-lockingly fixed directly in said sleeve, said receiving body having a through-conduit in longitudinal direction for fixation of portions of a partially unsheathed optical cable having a fiber with an unsheathed front end to be fixed in said receiving body.

2. The support receptacle according to claim 1, wherein said receiving body has at least one radial form-locking element engaging said sleeve from behind.

3. The support receptacle according to claim 1, wherein said molded receiving body has a frustoconical front end region.

4. The support receptacle according to claim 1, wherein said molded receiving body has a back end region with a kink protector.

5. A method for producing a support receptacle for coupling an optical cable end piece, which comprises:
    a) forming part of an injection mold for a molded part with a sleeve;
    b) introducing a mold core approximately centrally penetrating the sleeve into the injection mold, defining a void between the sleeve and the mold core;
    c) filling the void between the sleeve and the mold core with a molding material; and
    d) subsequently removing the mold core, and fixing portions of a partly unsheathed optical cable having an optical fiber with a fixing composition in a through-conduit formed by the mold core.

6. The method according to claim 5, which comprises finishing a protruding unsheathed front end of the optical fiber in final form jointly with the molded part.

7. The method according to claim 5, which comprises:
    forming the sleeve as an outer metal sleeve having a coupling side with a flange of weldable material for permanent fixation to a counterpart surface of a coupling partner; and
    forming the molded part as a receiving body at least partly surrounded by the sleeve, injection molded directly in the sleeve and form-lockingly fixed directly in the sleeve.

8. The method according to claim 7, which comprises forming at least one radial form-locking element on the receiving body for engaging the sleeve from behind.

9. The method according to claim 7, which comprises forming a frustoconical front end region on the molded receiving body.

10. The method according to claim 7, which comprises forming a back end region with a kink protector on the molded receiving body.

* * * * *